FIG. I
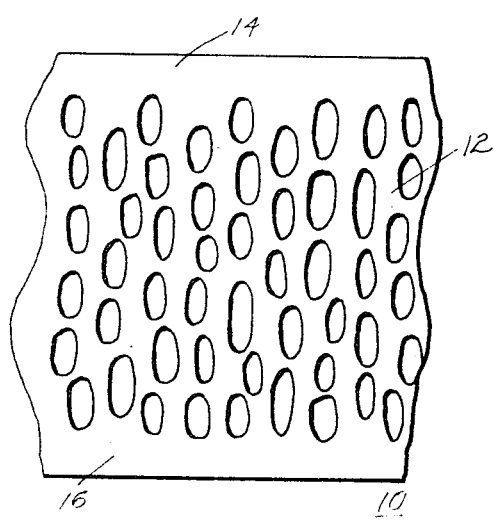
FIG. II
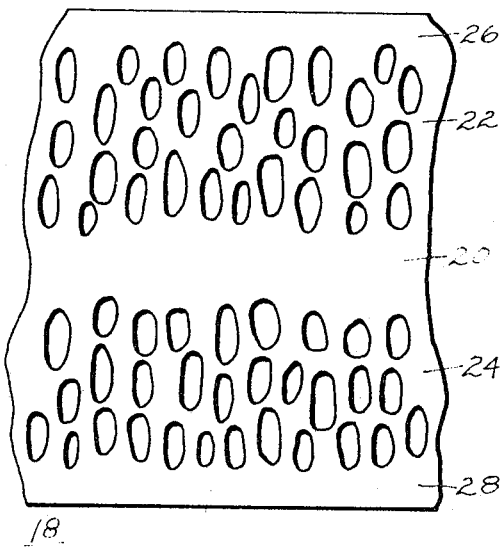
FIG. III
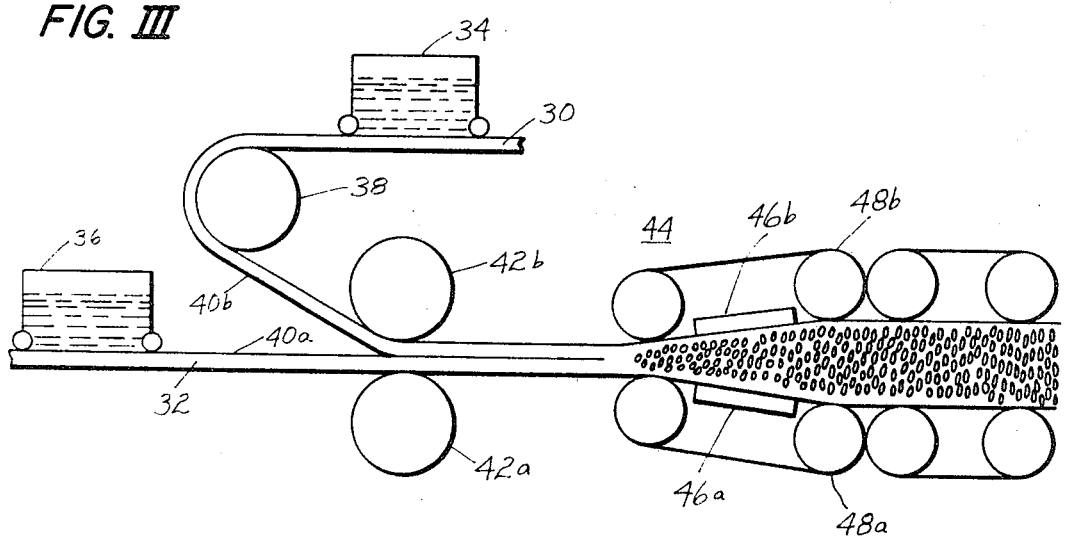
INVENTOR.
EDGAR E. HARDY
DAVID A. RUSSELL FIG. IV
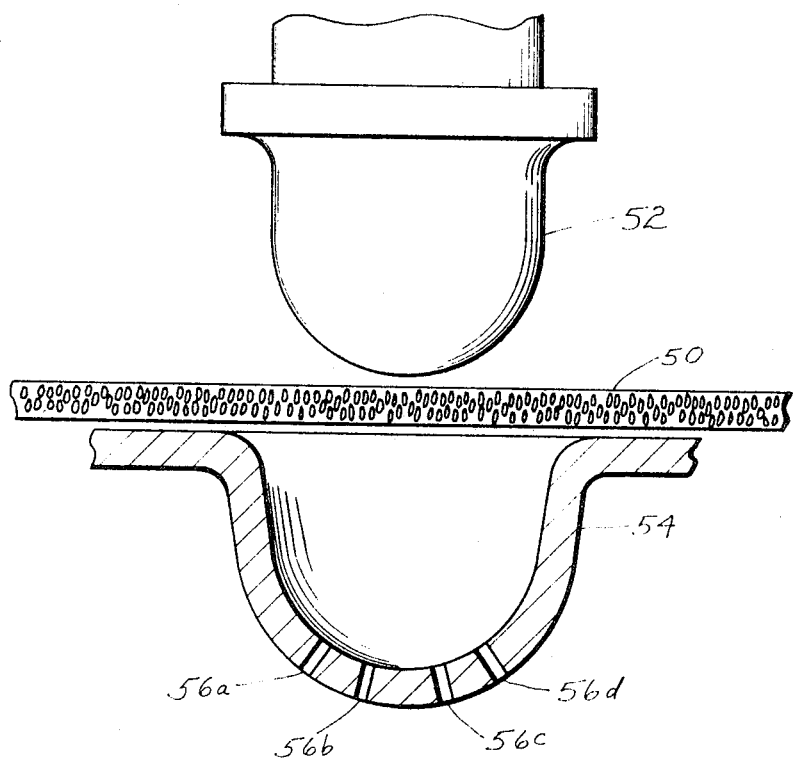
FIG. V
INVENTOR.
EDGAR E. HARDY
DAVID A. RUSSELL
BY
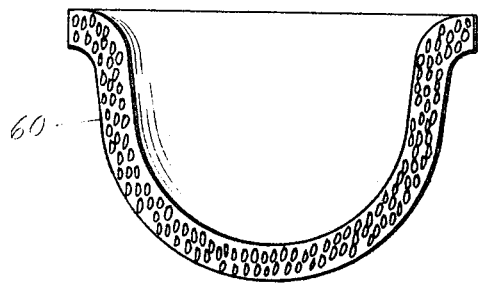
ATTORNEY:

United States Patent Office 3,444,036
Patented May 13, 1969

3,444,036
STRUCTURE HAVING AN INTERNAL CELLULAR CORE AND ITS MANUFACTURE
David A. Russell, Wilbraham, Mass., and Edgar E. Hardy, Kettering, Ohio, assignors to Monsanto Company, St. Louis, Mo., a corporation of Delaware
Continuation-in-part of application Ser. No. 272,540, Apr. 12, 1963. This application May 10, 1966, Ser. No. 548,905
Int. Cl. B32b 5/18, 3/26
U.S. Cl. 161—161                                     4 Claims

ABSTRACT OF THE DISCLOSURE

Lightweight structures having an improved combination of insulating and structural characteristics are prepared by exposing a plastic surface to a volatile, absorbable medium until the medium is absorbed partially through the plastic, intimately contacting at least a portion of the treated plastic surface with a second plastic surface which may or may not have been similarly treated, and subjecting the resulting assembly to a temperature at least as high as the gas transition temperature of the volatile medium to form an integral unit comprising a pair of substantially non-cellular plastic layers and an internal cellular core.

---

This application is a continuation-in-part of application Ser. No. 272,540 filed Apr. 12, 1963, now U.S. Patent 3,262,625.

This invention relates to novel cellular core structures and to a method for preparing same.

Strong and durable lightweight structures having good load-bearing and insulating characteristics are needed to meet the ever-increasing demands of the aircraft, automotive and other industries. Consequently, various types of laminated structures employing relatively rigid facings and foamed or honeycomb interiors have been developed. However, the utility of these laminated structures has been limited to a large extent by their inability to withstand lateral and complex stresses particularly where the materials which are assembled in laminate form are dissimilar. Of more importance, the application of laminated structures which have been formed utilizing dissimilar or even similar materials bonded together has been severely limited because the laminates cannot be effectively molded or reformed into consumer type articles without sacrificing much of their original structural properties.

It has now been found that structures having cellular cores can be produced which have improved structural and molding characteristics and which can be used to produce consumer type articles varying from simple to complex shapes.

Accordingly, a principal object of the present invention is to provide structures with cellular cores having improved structural properties.

Another object of the present invention is to provide structures having cellular cores which can be molded to produce articles having improved structural properties.

Another object of the present invention is to provide structures with cellular cores having an improved combination of insulating and structural characteristics.

Another object of the present invention is to provide an efficient method for preparing structures having cellular cores.

Other objects of the present invention will in part be obvious and will in part appear hereinafter.

These and other objects are attained by exposing a plastic surface to a medium absorbable by the plastic for a predetermined interval of time, intimately contacting at least a portion of said surface with a second plastic surface and subjecting the resulting assembly to elevated temperatures. The medium which is absorbable by the plastic is considered to be any material which is (1) absorable by the plastic being processed and (2) convertible to a gaseous state at a temperature below 150° F. above the softening temperature of the plastic. Elevated temperatures means any temperature within the range defined as between the gas transition temperature of the medium which is absorbable by the plastic and a temperature which is 150° F. above the softening temperature of the plastic. In general, when the medium is a liquid, the gas transition temperature is the normal boiling temperature of the liquid. The softening temperature of the plastic may also be considered to be the Heat Distortion Temperature of the plastic as determined by ASTM Test D–1525–58T.

The following drawings are provided for the purpose of illustrating various embodiments of the present invention.

FIGURE I is a side view, partly in section and with parts broken, illustrating an embodiment of the present invention. More specifically, a foamed core structure.

FIGURE II is a side view, partly in section and with parts broken, illustrating an alternate embodiment of the present invention. More specifically, a double foamed core structure.

FIGURE III is a side view, partly in section and with parts broken, illustrating a method for manufacturing the foamed core structure of the present invention.

FIGURE IV is a fragmentary perspective side view of a foamed core structure of the present invention prior to being subjected to a molding process.

FIGURE V illustrates the panel member shown in FIGURE IV after being subjected to the molding process.

Referring in detail to the figures of the drawings and more specifically, FIGURE I, there is schematically shown a foamed core structure 10 composed of a plastic material having a foamed or cellular mid-portion 12 extending outwardly to the border of adjacent upper and lower layers 14 and 16, respectively, wherein a rather sharp transition from a cellular to non-cellular or solid state is shown. Although the layers 14 and 16 are solid or of a substantially unfoamed state while a mid-portion 12 is cellular in structure, the entire panel or structure 10 is an integral unit, that is, there is a total integration between the cellular and non-cellular areas throughout the structure which would not exist if foamed and non-foamed sections were simply adhered together. FIGURE II illustrates another embodiment of the present invention wherein an integral unit 18 is formed with a non-cellular mid-section 20 between separately foamed areas 22 and 24 having non-foamed or non-cellular externally exposed upper and lower layers 26 and 28 respectively.

FIGURE III illustrates a typical method for manufacturing the structures of the present invention. Two continually advancing sheets 30 and 32 are each exposed to a volatile medium which is absorbable by the plastic after which the mutually exposed surfaces are drawn together and heated under controlled conditions causing the opposing sheets to foam apart. More specifically, sheets 30 and 32 pass in contact with a volatile medium 33 contained in chambers 34 and 36, respectively. In this manner the medium is absorbed into the plastic sheet a depth depending on the medium, the plastic material, time of exposure to the medium and the temperature of the medium. After sheet 30 has been exposed to the medium, it is passed over roll 38 to turn the sheet parallel and into synchronous advance with sheet 32. Both sheets 30 and 32 are then advanced into contact at their mutually exposed surfaces 40a and 40b by pull rolls 42a and 42b, to conveying system 44 where the composite is heated on both sides by electrically heated plates 46a and 46b situated behind conveying belts 48a and 48b respectively. The conveying system 44 consists of two diverging belts 48a and 48b which serve to control the rate and extent of foam expanded structure having a central core of foamed material and outer layers in unfoamed state. As expanded structure passes from the conveying members it is continuously cooled and cut into various sizes depending upon the uses for which they are intended. The structure shown in FIGURE II may be produced by the same process except that a third sheet is interposed between the two continually advancing sheets 30 and 32 which may or may not have had its contacting surfaces exposed to the volatile medium. If desired, more than one sheet may be interposed producing a plurality of foamed and non-foamed bands. Furthermore, the interposed sheets may be exposed to the volatile medium sufficiently long to permit complete foaming of the interposed sheet upon heating thereby producing structures having foamed cores of any predetermined thickness.

FIGURES IV and V illustrate the versatility of the present structures by its moldability to produce highly useful lightweight articles of manufacture. More specifically, member 50 which has a foamed mid-portion is placed between male and female molding members 52 and 54. Member 10 is then initially subjected to heat by any suitable means not shown after which male member 52 draws the panel structure 50 within female mold member 54 aided by vacuum applied through parts 56a, 56b, 56c and 56d to produce the cup shaped article 60 shown in FIGURE V.

The above description and particularly the drawings are set forth for the purpose of illustration and not for the purpose of limitation. In practice of the present invention, a plastic sheet member is exposed to a voltaile substance at one surface which is absorbed partially into the sheet member after which the exposed surface is placed in contact with a second sheet member which may or may not have been similarly treated at its contacting surface. The resulting assembly is then subsequently heated causing the absorbed portions of one or both sheet members, as the case may be, to expand. In most instances, it is preferable to control the rate and extent of expansion for maximum uniformity and control of cell size and shape. Inspection of the structures produced by the present method disclose that complete unification of the foamed portions has taken place producing an unusually tight area of bond which could not be obtained by separately foaming the individual sheet members and consequently bonding them together.

The following example is given to illustrate the invention and is not intended as a limitation thereof. Unless otherwise specified, quantities are mentioned on a weight basis.

EXAMPLE I

A cellular core structure is prepared by exposing one side of each of two 48″ wide x 96″ long x 0.072″ thick sheets of acrylonitrile:butadiene:styrene (35:15:50) material, molecular weight (Staudinger) equals 80,000 to dichloromonofluoromethane for 15 seconds after which the exposed surfaces of both sheets are placed in contact in a press under a force applied equal to 350 p.s.i. This pressure is maintained at a temperature of 240° F. for 10 minutes after which the press is opened gradually to a total distance of 0.30″ measured between press plate surfaces. Inspection of the finished part discloses unfoamed top and bottom layers having a total thickness of approximately 0.060″ and a cellular core approximately 0.180″ thick and 9 lbs./cu. ft. in density. Examination of the cells indicates that for the most part they are columnar with the long axis extended generally perpendicular to the plate of the composite.

A second structure is prepared utilizing individual pieces bonded together. This structure is herein referred to as "control structure." More specifically, two 48″ wide x 96″ long x 0.030″ thick sheets of acrylonitrile; butadiene; styrene (35:15:50) material, molecular weight (Staudinger) equals 80,000, are placed on opposite sides of a 48″ wide x 96″ long by approximately 0.180″ thick—9 lbs./cu. ft. foamed section of the same plastic material and the entire assembly is then bonded or fused together by the application of 300° F. against the external surfaces of the upper and lower sheets of the assembly.

Both the cellular core structure and the control laminate are subjected to a series of compression tests producing an average test result of 250 p.s.i. for the cellular cored structure and 160 p.s.i. for the control laminate. In other words, a significant improvement is compression strength is attained. Furthermore, shear tests indicate a substantial improvement in shear strength is also obtained on the cellular core structure when compared in relation to the control laminate.

EXAMPLE II

The procedure of Example I is repeated except that styrene homopolymer molecular weight (Staudinger) equals 90,000, is used in place of the acrylonitrile:butadiene:styrene material of Example I and the material is exposed to trichlorofluoromethane for a period of 60 seconds as opposed to exposing the material to dichloromonofluoromethane for 15 seconds. Substantial improvements similar to those of Example I are obtained.

As indicated above the cellular cored structure of the present invention is superior in terms of compression and shear strength properties over the control structure which is prepared from separate pieces to closely approximate the physical makeup of the cellular cored structure. Furthermore no discontinuity is noted in the transition area between the unfoamed portions of the cellular cored structure as is evident in the control structure.

Regarding the equipment used to carry out the present process, all that is essential is that a volatile medium which is absorbed by the plastic be allowed to contact the surface of the plastic for predetermined length of time and that the contacted or exposed area of the sheet be placed in contact with a second member and two contacting members subjected to a heat source sufficient to expand the assembly to a desired thickness. FIGURE III illustrates a bottomless chamber containing a liquid volatile substance which is held in the chamber by the sheet passing in contact with the chaamber bottom. It is, of course, obvious that other means may be used such as vapor, coating methods and even folding the sheet to retain a pool of liquid during this step.

In most instances, all that is required is that the opposing sheets lightly but intimately contact each other. However, the degree of pressure exerted upon the sheets may vary within wide limits. In general, it is preferable that the expansion be controlled by confining means such as for example, the diverging members shown in FIGURE III. Again other suitable means may be substituted such as platens maintained against the panel surfaces under pressure. Irregularly shaped resisting means may be used to produce articles of varying cross-section. In some instances, the resisting means may be eliminated completely. It may be desirable, for example, outdoor exposure, to have the outer sheet member itself comprised of more than one layer, with the resultant structure still an integral unit. After expansion, the structure is cooled and may be cut into various shapes.

In general, the plastics treated in the practice of this invention are plastic sheet materials which include polymers such as those based on styrene, vinyl halide, vinylidene halide, vinyl acetate, cellulose ester, ethyl cellulose, acrylic acid esters, methacrylic acid esters, acrylonitrile, ethylene, propylene and higher olefins, isobutylene, halogenated olefins, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber-modified polystyrene or polystyrene which preferably has incorporated therein a rubber compound grafted onto the molecule. Another particularly useful material is a terpolymer polyblend system of acrylonitrile, butadiene and styrene. It is not necessary that both of the opposing sheets be of the same material. In most instances, structures having unusual properties can be obtained by contacting sheet materials of different compositions to obtain the needed properties resulting from the combination of the two compositions. Carried further, it is also possible to join more than two members, each of which can be of different composition if desired to produce structures having unusual property combinations. Generally, when more than two sheet members are involved in the structure the center member has both sides or surfaces in the foamed state. In fact, the internal sheet member may be either partially or entirely foamed.

The medium which is absorbable by the plastic is considered to be any material which is (1) absorbable by the plastic being processed and (2) convertible to a gaseous state at a temperature below 150° F. above the softening temperature of the plastic. Preferably, the medium will contain or be a solvent for the plastic and may possibly include a nonsolvent to regulate or slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to foam on the subsequent application of heat.

The choice of the medium which may be employed will depend primarily on the type of plastic material which is to be steeped. For example, ethylene oxide or dichlorofluoromethane is considered quite suitable for the acrylonitrile-butadiene-styrene terpolymers while trichlorofluoromethane is less desirable. On the other hand, trichlorofluoromethane is considered quite suitable for polystyrene homopolymers and rubber modified polystyrene interpolymers. Among the solvents which find application in the present process there may be listed trichlorofluoromethane, sulphur dioxide, dichlorofluoromethane, methylene chloride, ethylene oxide, methyl formate, butadiene, acetone, dichloroethylene, carbon tetrachloride, dichlorofluoromethane, methyl sulfide, methyl ethyl ketone, benzol, chloroform and the like. Among the materials which sometimes find utility as nonsolvents or solvents depending on the type of plastic, there may be included methanol, ethanol, n-petane, isopentane, hexane, dichloroethylene and the like.

The exposure of the plastic to the medium generally requires only a few seconds to a few minutes for optimum absorption depending for the most part on the depth of foam desired, the type of medium used, and the respective temperatures of the medium and plastic article. In general, the time of exposure to the medium is directly proportional to the square root of the depth of absorption into the plastic. The time of exposure then will always be less than that which would result in complete absorption throughout the plastic layer. As previously indicated, this operation may be carried out by any suitable method such as immersion of the plastic article in a liquid medium or even by subjecting the plastic article to solvent vapors in a vessel which may or may not be pressurized.

In general, the plastic structure is aged a short interval of time between contact and heating to allow deeper diffusion of the medium within the depth of the plastic material. If desired, the temperature of the material may be elevated somewhat to increase the rate of diffusion. On the other hand, if the temperature is increased significantly, it may be desirable to increase the pressure on the opposing sheets to prevent premature expansion.

After this aging interval, a plastic assembly is heated to foam the innermost portions of the joining members. The heating means utilized may vary and the final results being affected by the uniformity of heating, rate of heating and temperature level at which it is conducted. In the case of biaxially oriented plastic, it is sometimes necessary to support or fix the structure dimensionally to minimize loss of orientation during the process of operation.

The products of this invention are formed from substantial thermoplastic materials. The structures which may be fabricated from the practice of this invention are especially useful for panel applications requiring high insulating characteristics and good structural properties. In addition, the panel members are lightweight and have a variety of uses in the building trade. Furthermore, the panel members themselves can be heated and molded to produce a variety of shapes such as cups, containers, boat hulls, enclosures, structural members, etc.

The above description and particularly the drawings are set forth for purposes of illustration only. Many variations and modifications thereof will be obvious to those skilled in the art and can be made without departing from the spirit and scope of the invention herein described.

What is claimed is:

1. A structure comprising a pair of substantially non-cellular plastic layers and an internal cellular core produced by exposing a plastic surface to a medium which is absorbable by the plastic and convertible to a gaseous state at a temperature less than 150° F. above the softening temperature of the plastic until the medium is absorbed partially through the plastic, intimately contacting at least a portion of said plastic surface with a second plastic surface, and subjecting the resulting assembly to an elevated temperature between the gas transition temperature of said medium and a temperature which is 150° F. above the softening temperature of the plastic.

2. A method of manufacturing structures having cellular cores which comprises exposing a plastic surface to a medium absorbable by the plastic until the medium is absorbed partially through the plastic, intimately contacting at least a portion of said surface with a second plastic surface and subjecting the resulting assembly to elevated temperatures.

3. The method according to claim 2 wherein the medium which is absorbable by the plastic is considered to be any material which is (1) absorbable by the plastic being processed and (2) convertible to a gaseous state at a temperature below 150° F. above the softening temperature of the plastic.

4. A method of manufacturing structures having cellular cores which comprises exposing a plastic surface to a material which is (1) absorbable by the plastic being processed and (2) convertible to a gaseous state at a temperature less than 150° F. above the softening temperature of the plastic until the material is absorbed partially through the plastic, intimately contacting at least a portion of said surface with a second plastic surface, placing the resulting assembly in confining means designed to control the rate of foam expansion and subjecting said resulting assembly to a temperature between the gas transition temperature of the material which is absorbable by the plastic and a temperature which is 150° F. above the softening temperature of the plastic.

References Cited

UNITED STATES PATENTS 2,962,407  11/1960  Aykanian _____ 264—47
3,262,625  7/1966  Russell et al. _____ 264—53 XR

FOREIGN PATENTS 916,116  8/1954  Germany.

PHILIP E. ANDERSON, *Primary Examiner.*

U.S. Cl. X.R.

156—79; 264—47, 53, 321